INVENTOR
David M. Frazier
BY
Robert A. Halvorsen

United States Patent Office 3,389,938
Patented June 25, 1968

3,389,938
CLOSED CIRCUIT SLURRIFIER
David M. Frazier, 208 Shore Crest Drive,
Tampa, Fla. 33609
Filed Aug. 15, 1966, Ser. No. 572,397
2 Claims. (Cl. 302—14)

ABSTRACT OF THE DISCLOSURE

A combination for mixing solids with liquids wherein the density of the mixture is controlled by separately regulating the introduction of solids and liquids in accordance with the density and velocity of discharge of the mixture.

---

This invention relates to a method and means of controlling the proportions of solids and liquids in slurries and of the accelleration of solids to pipeline velocities.

It is well known in the art of transporting solids to combine them with liquids and pump the mixture through pipes or hoses. This technique is widely used on a large scale in mining, dredging and construction projects as well as on a small scale in manufacturing foods, pharmaceuticals, paints and chemicals.

The chief object of this invention is to reduce the power requirements in such operations.

Another object is to provide a solid-liquid mixture of greater uniformity than has heretofore been available.

Another object is to reduce the amount of water or other liquid needed in the transporting operation.

Another object is to reduce the pump and pipeline maintenance costs of the operation by reducing vibration, shock, cavitation, water-hammer and other mechanical forces caused by variations in density, viscosity, and velocity of slurry.

A still further object is the reduction of capital costs by reducing pump requirements, reducing horsepower requirements, and by providing optimum utilization of benefaction plant by supplying a steady and uniform flow of solids.

Another object is to provide a means of controlling the slurry density at a maximum level relative to the critical velocity of the slurry.

Another object is to utilize the raw water energy being supplied to the slurry pit.

Another object is to break up and disperse conglomerate materials into smaller particles.

Other objects will be apparent to one skilled in the art from a study of the following description and drawings. I do not intend to limit myself to the particular details shown or described, except as defined in the claims.

In the drawings, in which similar numerals refer to similar parts,

For illustrative purposes the following description will refer to the phosphate mining industry, although the principles involved would apply to other applications as heretofore mentioned.

It is conventional in the phosphate industry to use very large power shovels and drag lines to dig from open pits the raw phosphate, mixed with clay, earth, stones and other impurities. This material is deposited in piles up to twenty-five feet high, located up to five miles from the benefaction plant.

The material is conventionally washed down the sides of the pile by the use of large manually directed nozzles which discharge streams of high velocity water against the sides. A mixture of material and water flow down by gravity to a pit below the pile, from whence the mixture is sucked up about ten feet to the intake of the centrifugal pump, which discharges into a pipe line about twenty inches in diameter. Booster pumps are provided as necessary in the pipe line to maintain the slurry velocity above the critical velocity at which the solid materials will settle to the bottom of the pipes. This conventional procedure provides no control of the relative quantities of water and solids.

Surge chambers are conventionally provided at the booster pumps and expensive electric speed controls are provided on the pump motors to adjust pump speed for variation in the proportions of solids and liquids in the pumped mixture and for volumetric variations.

In a typical installation the total required pump horsepower to convey material 20,000 feet through a 20 inch diameter pipe is 16,000 horsepower.

In an effort to improve this conventional process, the raw phosphate material is sometimes deposited in a large tank having jets of water directed therein to agitate the mixture before it is sucked into the pump inlet. This offers only slight advantages over the conventional streams of water directed on the slopes of the large piles of material.

Figure 1:
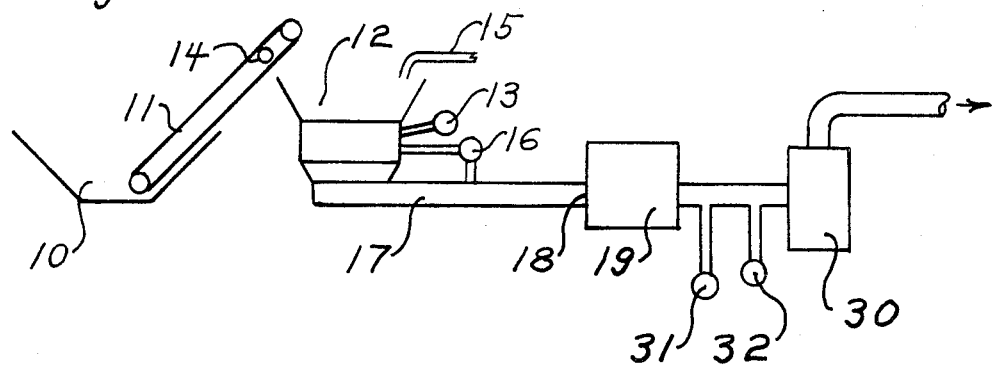
FIGURE 1 shows a schematic flow diagram of a preferred embodiment of the invention.

Turning now to a description of a preferred embodiment in the phosphate industry, FIGURE 1 shows schematically a pit 10 from which raw phosphate is conveyed by elevator 11 into a soaking chamber 12.

Chamber 12 has a conventional level control device 13 to maintain a level of solids by controlling the speed of motor drive 14 on elevator 11. Chamber 12 also is provided with an inlet for raw water 15 and means 16 to control the water level by varying the discharge rate of water from chamber 12 into the outlet of a solids discharge conveyor 17 located at the bottom of chamber 12.

Figure 2:
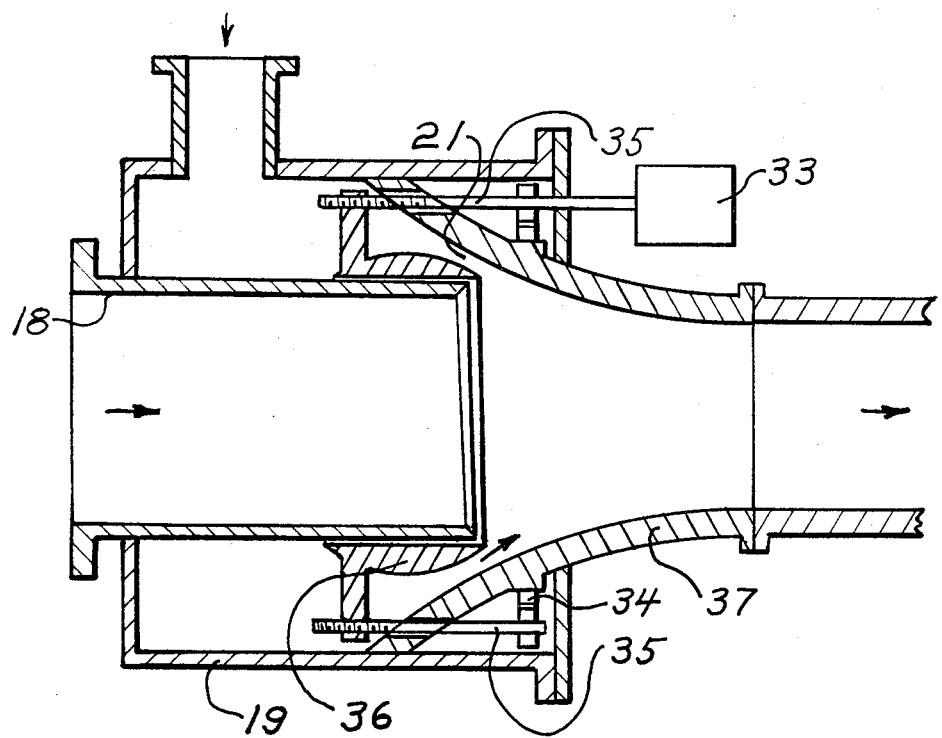
FIGURE 2 shows details of a preferred embodiment of a mixing chamber for controlling the proportions of solids and liquids.

Conveyor 17, which preferably is of the auger type, controls the rate of feed of predominently solid material into the central discharge 18 of mixing chamber 19, shown in detail in FIG. 2, directs this raw water through a variable annular orifice 21 which surrounds the solid material discharge 18. The shape of the annular orifice is such as to direct the stream of water toward the solids and effectively mix the water with the solids with a minimum loss of velocity energy by avoiding unnecessary turbulence.

The mixture of solids and water discharged from chamber 19 flows into the intake of booster pump 30, from where it flows through a sequence of pipes and booster pumps to a benefaction plant for subsequent treatment.

The material discharged from chamber 19 is controlled both as to velocity and proportion of solids to liquids by means of a conventional density meter 31 and a velocity meter 32, each located between chamber 19 and pump 30.

Density meter 31 is used to control the rate of feed of solids into discharge 18 by means of a variable speed drive for conveyor 17.

Velocity meter 32 controls the velocity of the material discharged from chamber 19 by activating motor 33 which rotates ring gear 34 which in turn rotates screws 35 to axially move a streamlined sleeve 36 toward or away from fixed nozzle 37. Alternately, sleeve 36 can be actuated by motor 33 through the use of a sprocket and chain. This axial movement varies the size of the annular orifice between sleeve 36 and nozzle 37, and so varies the volume of raw water introduced into chamber 19, which in turn varies the velocity of mixed material introduced into pump 30.

Sleeve 36 is proportioned to provide a sliding fit around solid discharge 18.

In the operation of this device, raw material is dumped into pit 10 and thenceforth is mixed with water and conveyed with controlled velocity and density as previously described, to the desired location. By close control of the density power efficiency is improved over conventional techniques wherein at times the pumped material contains substantially less than the optimum percentage of solids.

The described operation further reduces power costs because of the elimination of the energy loss involved in impringing streams of water on piles of solids. In the described operation the mixing of raw water and solids in chamber 19 is arranged to utilize the velocity energy of the raw water to accelerate the solid materials with minimum energy loss through turbulence. Chamber 19 thus efficiently serves as a pump, as a mixing device, as a velocity control, and a slurry density control.

Pit pump maintenance is greatly reduced by the use of this process for several reasons. First, the pump need not suck a mixture of water and solids from the pit at a 20 foot negative pressure, but instead the material is delivered to the pump inlet at about 50 pounds per square inch pressure, thereby eliminating destructive forces of cavitation.

Second, the pump impeller is not utilized to accelerate the solid particles up to the velocity of the liquid. This function has already been performed by mixing chamber 19. This greatly reduces wear and stress of the pump impeller.

Third, cavitation at the pit pump is eliminated because of the positive suction pressure, which in turn eliminates great fluctuations in pump and motor speed, and costly resulting vibrations.

In a typical phosphate mining operation pumping 858 cubic yards of solids five miles each hour, with an average slurry specific gravity of 1.30, the labor, water and power costs total 18.91 cents per cubic yard.

Utilizing the principles of this invention in the same operation increases the average specific gravity to 1.35, and reduces the total cost for labor, water and power to 9.78 cents per cubic yard.

This invention also produces substantial savings in capital and maintenance costs in the transporting operation as heretofore described; and similar savings in the benefaction plant due to the greater uniformity of the slurry delivered, fewer interruptions in delivery caused by breakdowns and maintenance operations in the transporting equipment.

While I have described my invention as applied in the phosphate industry, it will be apparent that similar advantages can be obtained by use of the invention in other industries which involve the transport of solids mixed with liquids.

I claim as my invention:

1. In a combination for mixing solids with liquids, an open chamber containing liquid in which solid materials are deposited, a closed mixing chamber into which solid materials are conveyed from said open chamber, a controllable means for introducing liquid into said mixing chamber, a discharge outlet from said mixing chamber, gauges for determining the velocity and density of the mixture flowing through said discharge outlet, means for controlling the rate of flow of solid materials into the mixing chamber inversely with changes in the density of the mixture being discharged, and means for controlling the rate of flow of liquid into the mixing chamber inversely with changes in the velocity of the mixture being discharged.

2. A mixing chamber comprising a closed container having an inlet for solid materials, a sleeve surrounding said inlet mounted for axial movement relative to said inlet, a fixed nozzle coaxial with said sleeve and proportioned to form an annular orifice with said sleeve around said inlet means for introducing liquid under substantially uniform pressure into said chamber, said nozzle communicating with a discharge pipe provided with gauges for measuring the velocity and density of the mixture flowing therein, and means actuated by said gauges to control the introduction of solids into said mixing chamber inversely with changes in density and to control the size of the annular orifice inversely with changes in velocity in said discharge pipe.

References Cited

UNITED STATES PATENTS

| | | | |
|---|---|---|---|
| 1,444,421 | 2/1923 | Kinyon | 302—42 |
| 2,404,937 | 7/1946 | Anderson | 302—35 |
| 2,727,792 | 12/1955 | Bearer | 302—35 |
| 2,915,336 | 12/1959 | Vaell | 302—14 |
| 3,159,431 | 12/1964 | Drew | 302—35 |

FOREIGN PATENTS 110,609  10/1917  Great Britain.

ANDRES H. NIELSEN, *Primary Examiner.*